(12) United States Patent
Sun (10) Patent No.: US 6,778,646 B1
(45) Date of Patent: Aug. 17, 2004

(54) SYSTEM AND METHOD FOR COUPLING MULTIPLE HOME NETWORKS

(75) Inventor: Ting Sun, San Jose, CA (US)

(73) Assignee: 2Wire, Inc., San Jose, CA (US)

( * ) Notice: Subject to any disclaimer, the term of this patent is extended or adjusted under 35 U.S.C. 154(b) by 0 days.

(21) Appl. No.: 09/434,388

(22) Filed: Nov. 4, 1999

(51) Int. Cl.[7] ............................................. H04M 11/00
(52) U.S. Cl. .............................. 379/93.05; 379/93.06; 379/93.07; 379/93.09; 379/399.01
(58) Field of Search ...................... 379/416, 399.01, 379/413.02, 387.01, 390.02, 93.09, 93.01, 93.05, 93.06, 93.07, 93.11, 93.14, 93.15, 93.26; 370/352

(56) References Cited

U.S. PATENT DOCUMENTS

| | | | | |
|---|---|---|---|---|
| 5,625,863 A | * | 4/1997 | Abraham | 455/3.3 |
| 5,841,987 A | * | 11/1998 | Blatter et al. | 709/200 |
| 6,005,861 A | * | 12/1999 | Humpleman | 370/352 |
| 6,317,884 B1 | * | 11/2001 | Eames et al. | 709/217 |
| 6,341,127 B1 | * | 1/2002 | Katsube et al. | 370/352 |
| 6,453,040 B1 | * | 9/2002 | Burke et al. | 379/387.01 |
| 6,580,710 B1 | * | 6/2003 | Bowen et al. | 370/353 |
| 6,622,307 B1 | * | 9/2003 | Ho | 725/120 |
| 6,636,505 B1 | * | 10/2003 | Wang et al. | 370/352 |
| 6,678,737 B1 | * | 1/2004 | Bucher | 709/231 |

* cited by examiner

Primary Examiner—Rexford Barnie
(74) Attorney, Agent, or Firm—Blakely, Sokoloff, Taylor & Zafman LLP (57) ABSTRACT

A system and method for coupling multiple home networks includes a first copper wire network, a second copper wire network, and a high pass coupler disposed between the first and second copper wire networks. The high pass coupler is configured to transfer data signals between the first and second copper wire networks, the data signals having frequencies greater than a maximum plain old telephone service signal frequency. Further, the high pass coupler is configured to prevent cross-talk of plain old telephone service, or voice-band, signals between the first and second copper wire networks. The data signals transferred typically include signals in accordance with the Home Phoneline Networking Alliance standard, and may also include broadband Internet access signals. In one embodiment, the high pass coupler is implemented in a residential gateway device. In another embodiment, the high pass coupler is implemented in a network coupler that couples the copper wire networks while maintaining access points to the first and second copper wire networks.

27 Claims, 8 Drawing Sheets

SYSTEM AND METHOD FOR COUPLING MULTIPLE HOME NETWORKS

BACKGROUND OF THE INVENTION

1. Field of the Invention

This invention relates generally to electronic networks, and relates more particularly to a system for coupling multiple home networks.

2. Description of the Background Art

An electronic device in an electronic network may advantageously communicate with other electronic devices in the network to share data and substantially increase the resources available to individual devices in the network. Electronic networks are often implemented as Local Area Networks (LANs) utilizing dedicated wiring installed for that purpose. The advantages of an electronic network are also desirable in a home-computing environment. A home network allows multiple computers and other electronic devices to share data, Internet access, and peripheral devices such as printers and scanners. A home network may also allow digital voice and video services to be accessed by devices anywhere in the home.

Installing dedicated network wiring, for instance an Ethernet LAN, may not be practical for a home network. One type of home network utilizes the existing copper telephone wiring in the home. Data may be transferred between various electronic devices in the home via the copper wiring without interrupting regular telephone service. Thus, a home network may be established without installing new wires.

Internet service may be provided to a home via a broadband solution such as Digital Subscriber Line (DSL) or cable modem. A home network allows multiple computers to access the Internet using only one DSL line or cable into the home. All of the computers in the network typically must be connected to the same telephone line.

Some homes receive telephone service over more than one telephone line. Often such a home will have one main telephone line and a second line for Internet access, a dedicated facsimile line, or a family member. This second telephone line may also be utilized to carry data in a second home network. It would be advantageous to allow computers on the second telephone line to exchange data with computers and peripheral devices on the first telephone line. In addition, it would be advantageous to allow computers on the second telephone line to access the Internet using a DSL line or cable; however, installing a second DSL line would not be cost-effective or efficient.

Coupling multiple home networks would maximize the resources available to devices on the network, and would provide broadband Internet access to devices on the network without the cost of additional access lines or cables. Therefore, there is a need for a cost-effective and efficient system for coupling multiple home networks.

SUMMARY OF THE INVENTION

In accordance with the present invention, a system and method are disclosed for coupling multiple home networks. The invention includes a first copper wire network, a second copper wire network, and a high pass coupler between the first and second copper wire networks. The high pass coupler is configured to transfer data signals between the first and second copper wire networks, the data signals having frequencies greater than a maximum plain old telephone service signal frequency. The data signals typically include signals in accordance with the Home Phoneline Networking Alliance (HPNA) standard, and may also include broadband Internet access signals.

In one embodiment, the high pass coupler is implemented in a residential gateway device disposed between the first and second copper wire networks. The residential gateway device includes an ADSL modem for providing broadband Internet access to all of the devices in the first and second copper wire networks. The high pass coupler transfers HPNA signals and/or broadband Internet access signals, but blocks the transfer of Plain Old Telephone Service (POTS), or voice-band, signals.

In another embodiment, the high pass coupler is implemented in a network coupler that couples the first and second copper wire networks while maintaining access points to the first and second copper wire networks. The network coupler may be implemented anywhere in the home where there are access points to both copper wire networks in proximity. The network coupler may also be utilized in a home having no broadband Internet access to enable devices on one of the copper wire networks to transfer data signals to devices on the other copper wire network.

The present invention advantageously allows devices on the second copper wire network to access the Internet via the broadband Internet connection established on the first copper wire network. The present invention also allows devices on one of the copper wire networks to share resources with devices on the other copper wire network, including peripheral devices such as printers and scanners. The present invention advantageously allows this sharing of resources without interrupting regular telephone service on both copper wire networks by preventing low frequency signal cross-talk between the first and second copper wire networks. The present invention blocks transfer of low frequency POTS, or voice-band, signals between the first and second copper wire networks. Therefore, the present invention efficiently and effectively implements coupling of multiple home networks.

DETAILED DESCRIPTION OF THE PREFERRED EMBODIMENT

The present invention relates to an improvement in electronic networks. The following description is presented to enable one of ordinary skill in the art to make and use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
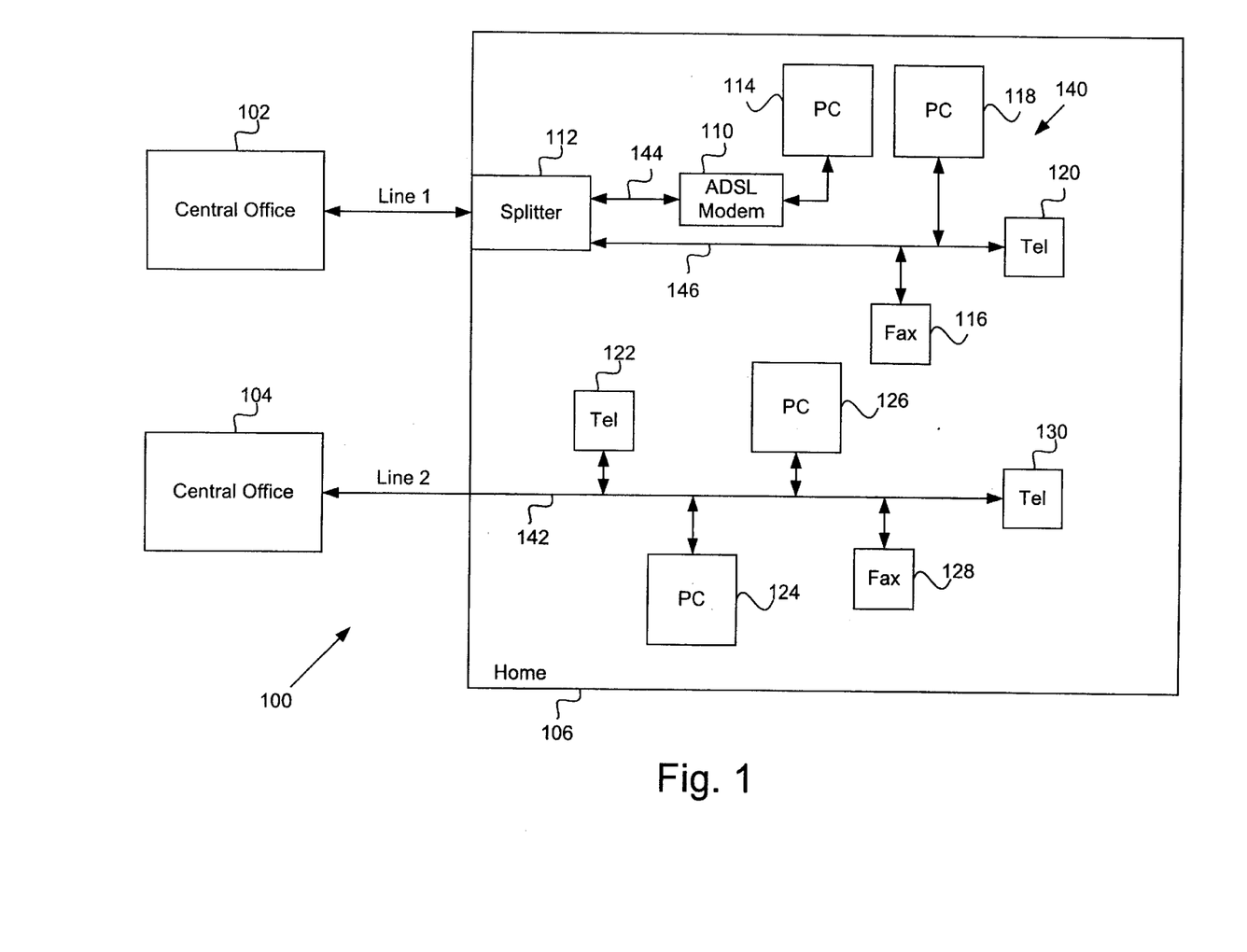
FIG. 1 is a block diagram for one embodiment of a home network system.

Referring now to FIG. 1, a block diagram for one embodiment of a home network system 100 is shown. A home 106 receives traditional telephone service (POTS) and broadband Internet service from a central office 102 via line 1. In the FIG. 1 embodiment, the Internet service is provided using Asynchronous Digital Subscriber Line (ADSL) technology; however, other broadband Internet access solutions, such as SDSL and HDSL, are within the scope of the present invention. Home 106 also receives traditional telephone service (POTS) from a central office 104 via line 2. Although two separate central offices are shown in FIG. 1, home 106 may receive services via line 1 and line 2 from a single central office.

A home network 140 includes, but is not limited to, a splitter 112, a POTS line 146, an ADSL line 144, an ADSL modem 110, a PC 114, a facsimile machine (fax) 116, a telephone (tel) 120, and a PC 118. Home network 140 may also include other electronic devices such as printers and scanners.

Splitter 112 splits an ADSL signal and a POTS signal received from central office 102 via line 1, sending the high frequency ADSL signal to ADSL line 144 and the low frequency POTS signal to POTS line 146. ADSL modem 110 demodulates the ADSL signal and sends the demodulated signal to PC 114. In an alternative embodiment, ADSL modem 110 may be disposed inside PC 114. PC 118 may include an internal modem, for instance a 56K analog modem, to exchange signals with the Internet via POTS line 146.

A second home network 142 includes, but is not limited to, line 2, a telephone 122, a PC 124, a PC 126, a fax 128, and a telephone 130. Home network 142 may also include other electronic devices such as printers and scanners. PC 124 and PC 126 each include a HPNA interface card so that these devices may share data across network 142. Telephone 122, fax 128, and telephone 130 each may include a low-pass filter so that these devices only receive POTS signals from network 142.

In the FIG. 1 embodiment, network 140 and network 142 are completely separate. Devices on network 140 cannot exchange data or share network services with devices on network 142. Connecting network 140 and network 142 would maximize the usefulness of the home networking environment. It is desirable that home networking devices such as PCs and printers be able to exchange data with any other device on network 140 and network 142. However, POTS devices such as telephones and fax machines on network 140 should not receive signals intended for POTS devices on network 142, and vice versa. Thus, network 140 and network 142 need to be coupled so that POTS devices continue to see two separate telephone lines and home networking devices, which utilize a high frequency signal band, see one integrated network.

Figure 2:
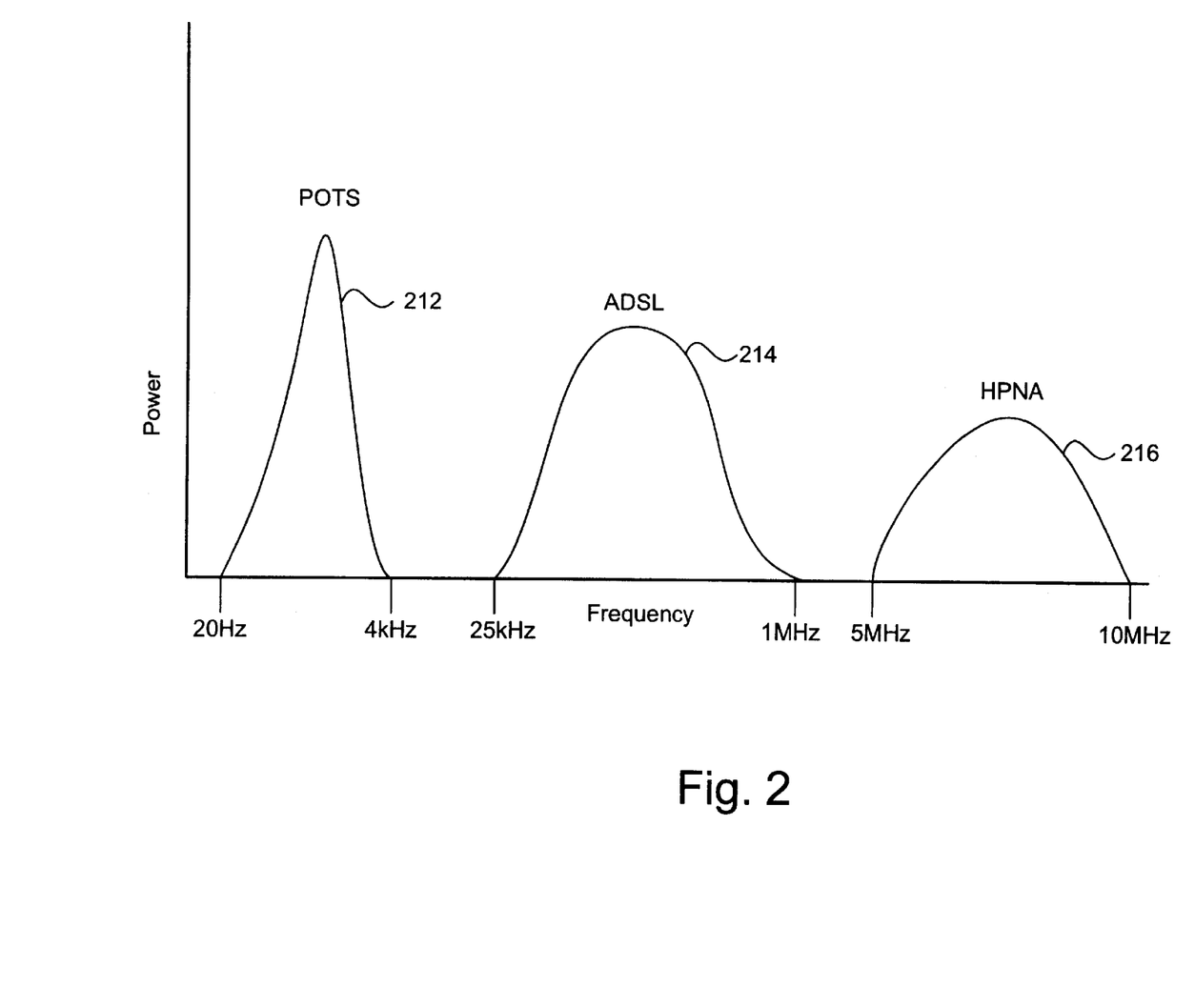
FIG. 2 is a graph of exemplary power spectrums and corresponding frequency ranges, according to one embodiment of the present invention.

Referring now to FIG. 2, a graph of exemplary power spectrums and corresponding frequency ranges is shown, according to one embodiment of the present invention. Three signals that may be present on a home network include a POTS signal, an ADSL signal, and a HPNA signal. These three signals occupy separate frequency ranges. As shown in FIG. 2, a POTS spectrum 212 occupies frequencies from approximately 20 Hz to 4 kHz. An ADSL spectrum 214 occupies frequencies from approximately 25 kHz to 1 MHz. A HPNA spectrum 216 occupies frequencies from approximately 5 MHz to 10 MHz.

Frequency division multiplexing (FDM) techniques are used to allow all three types of signals to be present on the same pair of wires in home 106. Use of appropriate frequency-selective filters enables devices using one type of signal to send and receive information without interference from the other signals. It should be noted that each frequency range is widely separated from the other frequency ranges.

Figure 3:
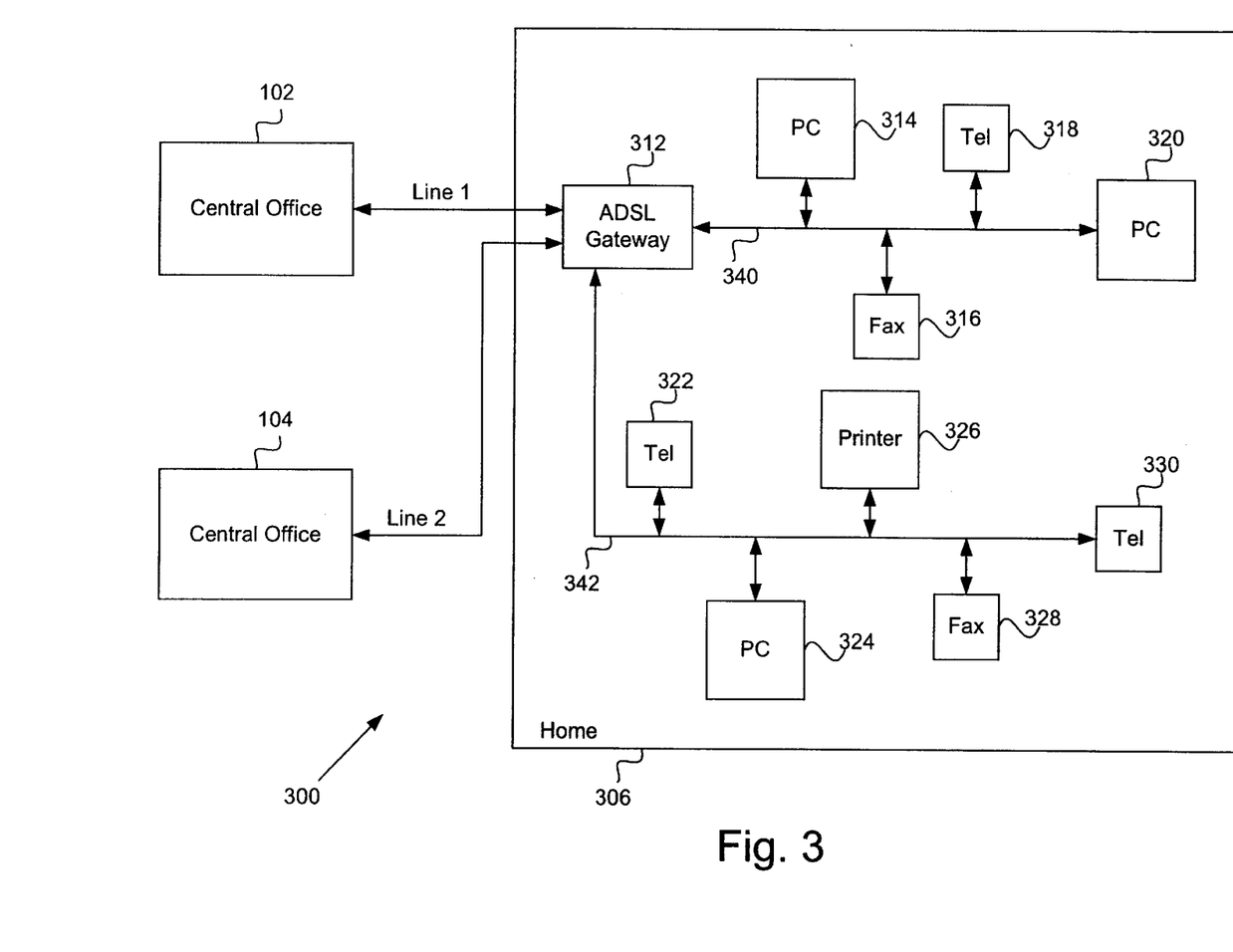
FIG. 3 is a block diagram for one embodiment of a home network system, according to the present invention.

Referring now to FIG. 3, a block diagram for one embodiment of a home network system 300 is shown, according to the present invention. In the FIG. 3 embodiment, line 1 and line 2 enter home 306 at an ADSL gateway 312, which is a residential gateway device. Network 340 and network 342 may exchange data via ADSL gateway 312. Fax 316 and telephone 318 see network 340 simply as a single telephone line (line 1), and telephone 322, fax 328, and telephone 330 see network 342 as a single telephone line (line 2). The POTS devices each may contain a low-pass filter to prevent the ADSL signals and HPNA data signals from interfering with their operation.

ADSL gateway 312 couples network 340 and network 342 so that a non-POTS device may exchange data with any other non-POTS device on either of networks 340 and 342. For example, PC 314 and PC 320 may send data across the coupled networks to a printer 326. The contents and functionality of ADSL gateway 312 are discussed in more detail below in conjunction with FIG. 4.

Figure 4:
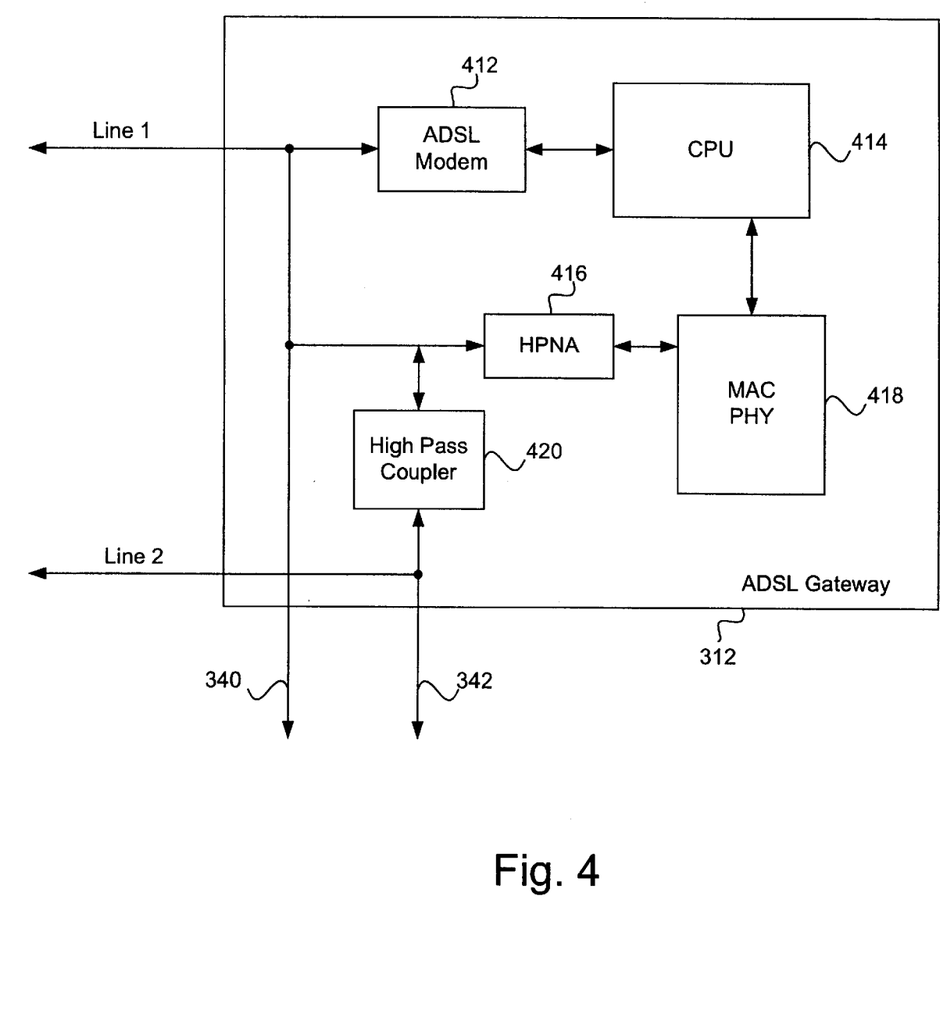
FIG. 4 is a block diagram for one embodiment of the ADSL gateway of FIG. 3, according to the present invention.

Referring now to FIG. 4, a block diagram for one embodiment of the ADSL gateway 312 of FIG. 3 is shown, according to the present invention. ADSL gateway 312 includes, but is not limited to, an ADSL modem 412, a CPU 414, a HPNA interface 416, a media access control and physical layer (MAC PHY) 418, and a high pass coupler, or filter, 420.

ADSL modem 412 demodulates an ADSL signal from central office 102, and sends the demodulated digital data to CPU 414. To send data out to the Internet, CPU 414 sends digital data to ADSL modem 412, and ADSL modem 412 modulates the data into an ADSL signal and sends the modulated signal to central office 102 via line 1. HPNA interface 416 modulates and demodulates HPNA signals for data exchange between ADSL gateway 312 and other home network devices on network 340 and network 342.

High pass coupler 420 couples line 1 and line 2, which effectively couples network 340 and network 342. High pass coupler 420 allows high frequency signals such as HPNA signals and/or ADSL signals to pass between network 340 (FIG. 3) and network 342 in home 306, thus creating one integrated home network.

However, high pass coupler 420 does not allow low frequency POTS signals to pass between line 1 and line 2. Blocking the exchange of POTS signals prevents cross-talk of POTS signals between line 1 and line 2. For example, a person using a telephone on line 1 will not be overheard by a person using a telephone on line 2. Similarly, a telephone may be in use on line 1 while a fax machine is transmitting on line 2. The contents of high pass coupler 420 are discussed further below in conjunction with FIG. 7.

In the FIG. 4 embodiment, high pass coupler 420 is advantageously included in ADSL gateway 312 at the time of manufacture. This embodiment of the present invention may be most useful in a home currently not receiving ADSL or other broadband Internet access. Installing ADSL gateway 312 thus provides broadband Internet access and multiple-line home networking in one package.

Figure 5:
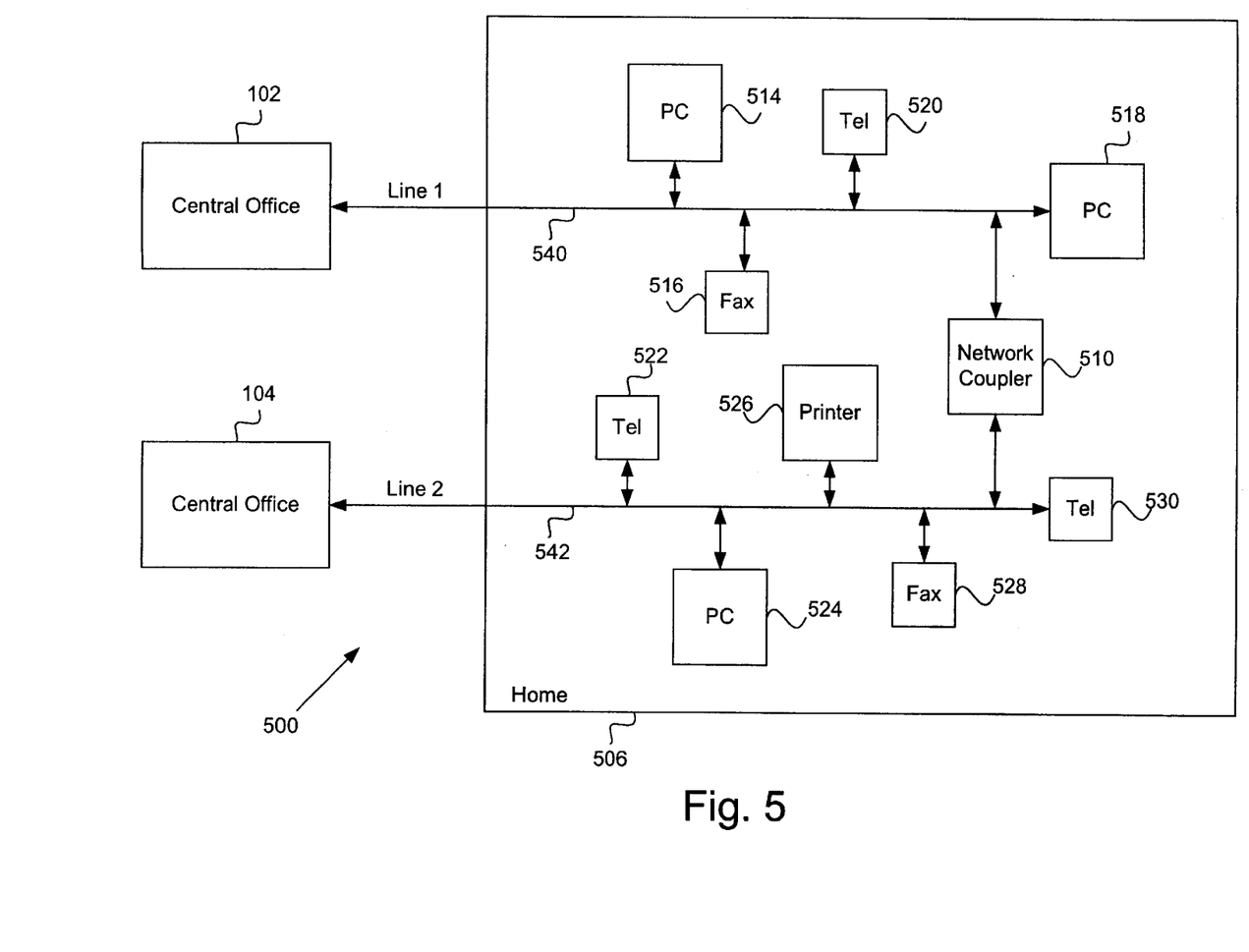
FIG. 5 is a block diagram for another embodiment of a home network system, according to the present invention.

Referring now to FIG. 5, a block diagram for one embodiment of a home network system 500 is shown, according to the present invention. In the FIG. 5 embodiment, a home network 540 receives traditional telephone service from central office 102 via line 1, and a home network 542 receives traditional telephone service from central office 104 via line 2. Network 540 and network 542 are coupled by a network coupler 510. Network coupler 510 couples network 540 and network 542 to create an integrated home network. Network coupler 510 allows non-POTS home-networking devices on network 540, such as PC 514, and non-POTS home-networking devices on network 542, such as a printer 526, to exchange data via HPNA signals. Network coupler 510 also blocks the exchange of low frequency signals between POTS devices such as telephones 520 and 530 across network 540 and network 542; that is, network coupler 510 prevents cross-talk of POTS signals between line 1 and line 2.

Network coupler 510 may also be utilized in home network systems having an ADSL gateway on one of the telephone networks, where the ADSL gateway is a different embodiment than ADSL gateway 312 of FIG. 3. Network coupler 510 may allow the exchange of ADSL signals, as well as HPNA signals, between non-POTS devices on the integrated home network. The contents and functionality of network coupler 510 are further discussed below in conjunction with FIG. 6.

Figure 6:
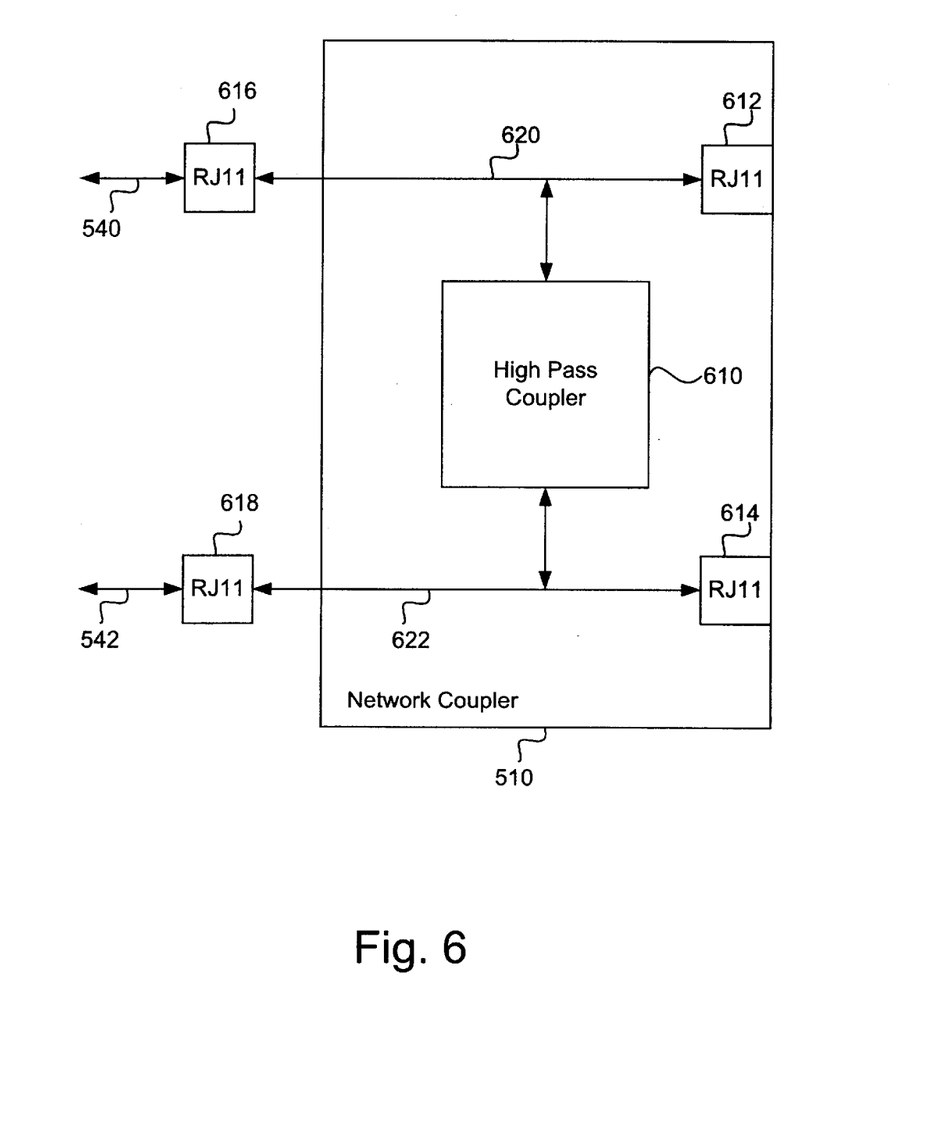
FIG. 6 is a block diagram for one embodiment of the network coupler of FIG. 5, according to the present invention.

Referring now to FIG. 6, a block diagram for one embodiment of the network coupler 510 of FIG. 5 is shown, according to the present invention. Network coupler 510 may couple network 540 and network 542 at any point in home 506 where access to both networks is available, for example a wall jack with connections to both networks. Network coupler 510 includes a high pass coupler 610 between path 620 and path 622. Path 620 is connected to network 540 at a RJ11 jack 616, and path 622 is connected to network 542 at a RJ11 jack 618. Thus network coupler 510 couples network 540 and network 542, passing high-frequency signals, such as HPNA signals, but blocking low-frequency POTS signals. Thus non-POTS devices on network 540 and network 542 may exchange data while preventing cross-talk and operational interference (e.g., on-hook and off-hook conditions) between POTS devices on the networks.

The FIG. 6 embodiment of network coupler 510 also includes a RJ11 jack 612 and a RJ11 jack 614. RJ11 jack 612 may be used to connect a POTS device or a network device to network 540 via path 620. RJ11 jack 614 may be used to connect a POTS device or a network device to network 542 via path 622. Thus network coupler 510 couples networks 540 and 542 while advantageously maintaining two access points to networks 540 and 542.

Figure 7:
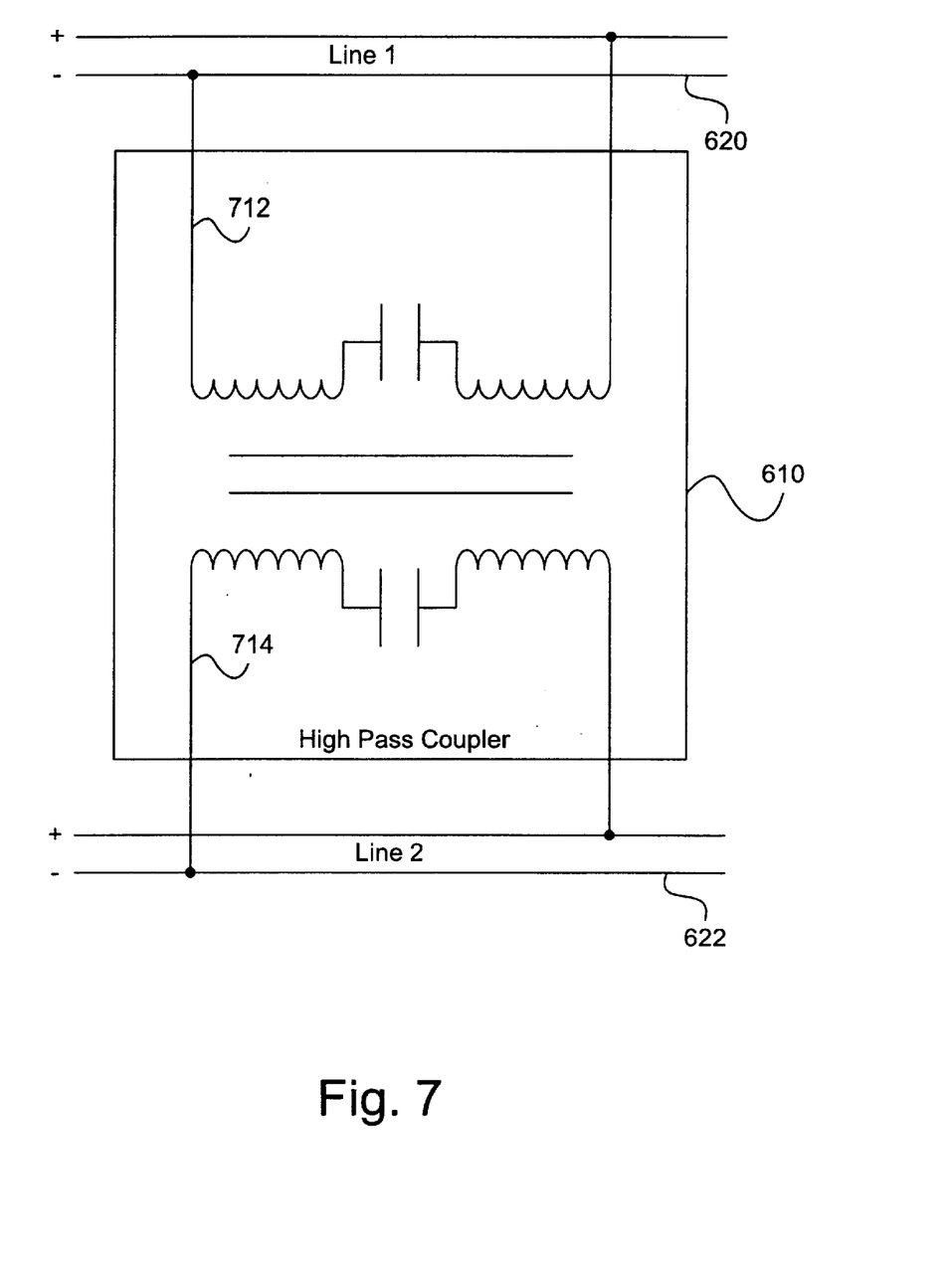
FIG. 7 is a diagram for one embodiment of the high pass coupler of FIG. 6, according to the present invention.

Referring now to FIG. 7, a diagram for one embodiment of the high pass coupler 610 of FIG. 6 is shown, according to the present invention. High pass coupler 610 may also be implemented in ADSL gateway 312 (as high pass coupler 420) as described above in conjunction with FIG. 4. High pass coupler 610 includes inductance coils (windings) 712 and 714 that couple the signals on line 1 and line 2. For example, a HPNA signal passing through coil 712 will be induced in coil 714 according to well-known principles. Coil 712 and coil 714 are identical so that the induced signals are identical to the original signals. Thus, a high frequency data signal may be exchanged between line 1 and line 2 with no modification.

The coupling inductance of high pass coupler 610 may be any value that effectively couples signals greater than a maximum POTS signal, about 4 kilohertz. A preferred value for the coupling inductance of high pass coupler 610 is about 10 microHenrys. However, other effective values for the coupling inductance of high pass coupler 610 are within the scope of the present invention.

A capacitor is disposed in the middle of each inductance coil 712 and 714 to create a high pass filter according-to well known principles for blocking the induction of POTS signals. Both capacitors preferably have the same capacitance value. Since the POTS frequency range is a significant distance away from the ADSL signal frequency range and the HPNA signal frequency range (see FIG. 2), the coupling inductance value and each capacitance value in high pass coupler 610 need not be determined with great precision. The component values of high pass coupler 610 may vary for networks that support broadband Internet access other than ADSL, and for networks that do not support any type of broadband Internet access.

For example, high pass coupler 610 having a coupling inductance of 10 $\mu$H and a value of 270 pF for each capacitor will effectively block the transfer of POTS signals and pass high frequency signals with a 3 dB cut-off frequency corner at about 2 MHz. Thus, high pass coupler 610 couples home networking signals across multiple home telephone networks while preventing low frequency cross-talk. Any other values for the coupling inductance and capacitance that effectively block the inductance of POTS signals in high pass coupler 610 and pass high frequency data signals are within the scope of the present invention.

Figure 8:
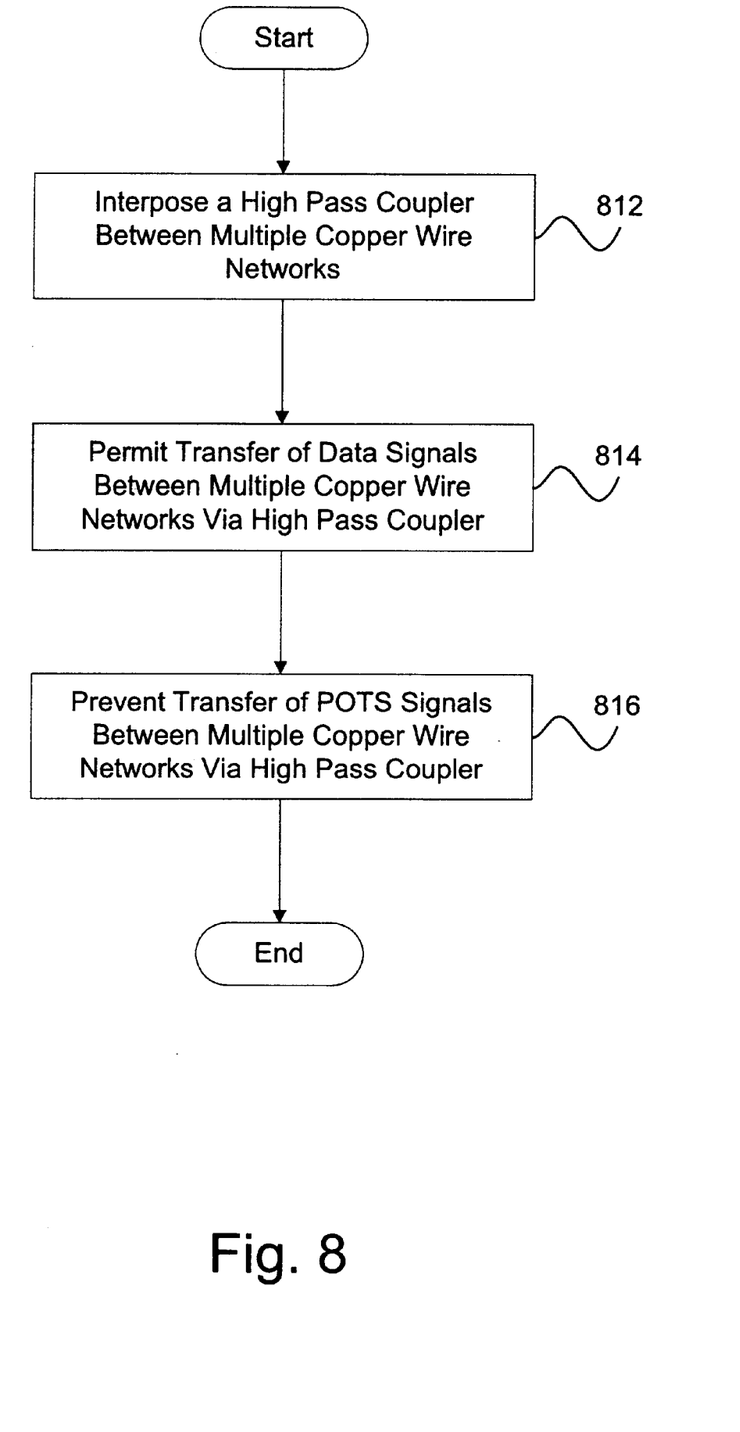
FIG. 8 is a flowchart of method steps for coupling multiple copper wire networks, according to one embodiment of the present invention.

Referring now to FIG. 8, a flowchart of method steps for coupling multiple copper wire networks is shown, according to one embodiment of the present invention. Initially, in step 812, a high pass coupler is interposed between multiple copper wire networks. The high pass coupler is preferably high pass coupler 610 (FIG. 7). The high pass coupler may be implemented inside a residential gateway device as shown in FIG. 4. The high pass coupler may alternately be implemented inside a network coupler 510 as shown in FIG. 6.

Next, in step 814, high pass coupler 610 permits transfer of high frequency data signals between the multiple copper wire networks. The high frequency data signals have frequencies that are higher than a maximum voice-band frequency, typically about 4 kHz. The data signals may include DSL or other broadband Internet access signals, and HPNA home networking signals. In step 816, high pass coupler 610 prevents transfer of POTS, or voice-band, signals between the multiple copper wire networks. Preventing the transfer of POTS signals allows POTS devices on one of the multiple networks to operate without interference from POTS devices on another of the multiple networks. Thus, the method of the present invention effectively and efficiently couples multiple home networks.

The invention has been explained above with reference to certain preferred embodiments. Other embodiments will be apparent to those skilled in the art in light of this disclosure. For example, the present invention may readily be implemented using configurations other than those described in the preferred embodiment above. Additionally, the present invention may effectively be used in conjunction with systems other than the ones described above as the preferred embodiments. Therefore, these and other variations upon the preferred embodiments are intended to be covered by the present invention, which is limited only by the appended claims.

What is claimed is:

1. A system for coupling multiple copper telephone wire networks, comprising:
   a first copper telephone wire network operable to carry voice signals and Internet data, wherein the first telephone wire network couples to a telephone;
   a second copper.telephone wire network; and
   a high pass coupler between said first copper telephone wire network and said second copper telephone wire network, said high pass coupler having a first capacitor and a first transformer configured to transfer data signals between said first copper telephone wire network and said second copper telephone wire network, said data signals having frequencies greater than a maximum plain old telephone service signal frequency.

2. The system of claim 1, wherein said data signals include Home Phoneline Networking Alliance standard signals.

3. The system of claim 1, wherein said data signals include broadband Internet access signals.

4. The system of claim 3, wherein said broadband Internet access signals are provided to said first copper telephone wire network via an Asynchronous Digital Subscriber Line.

5. The system of claim 1, wherein said maximum plain old telephone service signal frequency is about 4 kilohertz.

6. The system of claim 1, wherein said high pass coupler is implemented in a residential gateway device.

7. The system of claim 1, wherein said high pass coupler is implemented in a network coupler that provides an access point to said first copper telephone wire network and an access point to said second copper telephone wire network.

8. The system of claim 1, wherein said high pass coupler has a coupling inductance such that said data signals are transferred between said first copper telephone wire network and said second copper telephone wire network without modification.

9. The system of claim 1, wherein said high pass coupler has a coupling inductance of about 10 microHenrys.

10. The system of claim 1, wherein said transformer having at least two windings, each of said windings including a capacitor that blocks plain old telephone service signals.

11. A system for coupling multiple home networks, comprising:
    a first copper telephone wire network operable to carry voice signals and Internet data, wherein the first telephone wire network couples to a telephone;
    a second copper telephone wire network; and
    a high pass coupler having a first transformer and a first capacitor configured to exchange data between said first and second copper telephone wire networks, while preventing exchange of plain old telephone service signals between said first and second copper telephone wire networks.

12. The system of claim 11, wherein said data conforms to a Home Phoneline Networking Alliance standard.

13. The system of claim 11, wherein said data conforms to a broadband Internet access standard.

14. The system of claim 11, wherein said high pass coupler is implemented in a residential gateway device.

15. The system of claim 11, wherein said high pass coupler is implemented in a network coupler.

16. The system of claim 11, wherein said high pass coupler has a coupling inductance such that said data signals are transferred between said first copper telephone wire network and said second copper telephone wire network without modification.

17. The system of claim 11, wherein said high pass coupler has a coupling inductance of about 10 microHenrys.

18. The system of claim 11, wherein said high pass coupler is implemented in a network coupler that provides an access point to said first copper telephone wire network and an access point to said second copper telephone wire network.

19. The system of claim 11, wherein said plain old telephone service signals include signals having a frequency between about 0 hertz and 4 kilohertz.

20. A network coupler for interconnecting a first copper telephone wire network and a second copper telephone wire network, comprising:
    a high pass coupler having a transformer and a capacitor configured to transfer signals between said first and second copper telephone wire networks to produce an integrated network, said signals transferred have frequencies greater than a maximum plain old telephone service signal frequency and signals blocked have frequencies less than a maximum plain old telephone service signal frequency;
    an access point to said first copper telephone wire network; and
    an access point to said second copper telephone wire network, wherein said second copper telephone wire network is operable to carry voice signals and Internet data.

21. A method for coupling multiple copper telephone wire networks, comprising the steps of:
    interposing a high pass coupler between said multiple copper telephone wire networks;
    permitting transfer of data signals between said multiple copper telephone wire networks through said high pass coupler; and
    preventing transfer of plain old telephone service signals between said multiple copper telephone wire networks using said high pass coupler while passing signals having frequencies greater than five kilohertz, wherein a first copper telephone wire network is operable to carry voice signals and Internet data.

22. The method of claim 21, wherein said data signals conform to a Home Phoneline Networking Alliance standard.

23. The method of claim 21, wherein said data signals conform to a broadband Internet access standard.

24. The method of claim 21, wherein said high pass coupler is implemented in a residential gateway device.

25. The method of claim 21, wherein said high pass coupler is implemented in a network coupler.

26. The method of claim 21, wherein said high pass coupler is implemented in a network coupler that provides access points to said multiple copper telephone wire networks.

27. A system for coupling multiple copper telephone wire networks, comprising:
    high pass coupling means interposed between said multiple copper telephone wire networks, wherein a first copper telephone wire network is operable to carry voice signals and Internet data and couples to a telephone;
    means for permitting transfer of data signals between said multiple copper telephone wire networks; and
    means for preventing transfer of plain old telephone service signals between said multiple copper telephone wire networks.

* * * * *